(12) United States Patent
Caux et al.

(10) Patent No.: US 11,850,987 B2
(45) Date of Patent: Dec. 26, 2023

(54) CHASSIS ASSEMBLY FOR A DELIVERY VEHICLE

(71) Applicant: Volvo Truck Corporation, Gothenburg (SE)

(72) Inventors: Denis Caux, Villieu (FR); Jean-Roch Barbier, Fleurieux sur l'Arbresle (FR); Thierry Gronsfeld, Valencin (FR); Carole Fatet, Sathonay Village (FR)

(73) Assignee: Volvo Truck Corporation, Gothenburg (SE)

( * ) Notice: Subject to any disclaimer, the term of this patent is extended or adjusted under 35 U.S.C. 154(b) by 808 days.

(21) Appl. No.: 16/967,088

(22) PCT Filed: Feb. 21, 2018

(86) PCT No.: PCT/EP2018/054240
§ 371 (c)(1),
(2) Date: Aug. 3, 2020

(87) PCT Pub. No.: WO2019/161891
PCT Pub. Date: Aug. 29, 2019

(65) Prior Publication Data
US 2021/0046858 A1 Feb. 18, 2021

(51) Int. Cl.
*B60P 1/64* (2006.01)
*B60P 1/02* (2006.01)

(52) U.S. Cl.
CPC .............. *B60P 1/6445* (2013.01); *B60P 1/02* (2013.01); *B60P 1/6409* (2013.01); *B60P 1/6481* (2013.01)

(58) Field of Classification Search
CPC .......... B60P 1/6445; B60P 1/02; B60P 1/025; B60P 1/6409; B60P 1/6481; B60P 1/4414;
(Continued)

(56) References Cited

U.S. PATENT DOCUMENTS

| | | | |
|---|---|---|---|
| 5,803,698 A * | 9/1998 | Hoenersch | B60P 3/055 296/210 |
| 6,464,446 B1 * | 10/2002 | Hurler | B60P 1/02 414/545 |

(Continued)

FOREIGN PATENT DOCUMENTS

| | | |
|---|---|---|
| CN | 1142802 A | 2/1997 |
| CN | 1780748 A | 5/2006 |

(Continued)

OTHER PUBLICATIONS

Westrick, Ludger DE-202010001181-U1 machine translation, May 20, 2010 (Year: 2010).*

(Continued)

*Primary Examiner* — Amy R Weisberg
*Assistant Examiner* — Wenwei Zhuo
(74) *Attorney, Agent, or Firm* — Withrow & Terranova, PLLC

(57) ABSTRACT

The chassis assembly (3) includes a vehicle chassis (4) extending along a longitudinal direction (D1); a first supporting part (6) configured to support a first load unit (7.1) on a first longitudinal side (4.1) of the vehicle chassis (4); a second supporting part (8) configured to support a second load unit (7.2) on a second longitudinal side (4.2) of the vehicle chassis (4) opposite to the first longitudinal side (4.1); and a lifting device (5) secured to the vehicle chassis (4) and configured to lift up and down the first and second supporting parts (6, 8) with respect to the vehicle chassis (4) so as to vertically displace each of first and second load units (7.1, 7.2) supported by the first and second supporting parts (6, 8) between a loading/unloading position and a driving position.

14 Claims, 4 Drawing Sheets

(58) Field of Classification Search
CPC ..... B60P 1/4421; B60P 1/4492; B60P 1/4457; B60P 7/0807; B62D 53/062; B62D 25/2054; B66F 9/061; B66F 9/08; B66F 7/28
USPC .......... 296/26.01, 25, 193.07; 414/495; 187/225, 226, 230, 238; 410/90, 91, 80
See application file for complete search history.

(56) References Cited

U.S. PATENT DOCUMENTS

| | | | | |
|---|---|---|---|---|
| 7,568,877 | B1 * | 8/2009 | Nespor | B60P 1/02 414/544 |
| 2009/0208315 | A1 * | 8/2009 | Hurler | B60P 3/055 414/545 |
| 2012/0020764 | A1 * | 1/2012 | Nespor | B60P 3/055 414/545 |
| 2015/0239389 | A1 * | 8/2015 | Konchan | B60P 1/022 414/812 |
| 2015/0246631 | A1 * | 9/2015 | Konchan | B60P 1/02 414/813 |

FOREIGN PATENT DOCUMENTS

| | | | | |
|---|---|---|---|---|
| CN | 104875659 A | | 9/2015 | |
| DE | 4114044 A1 | * | 11/1991 | ................ B60P 1/02 |
| DE | 4114044 A1 | | 11/1991 | |
| DE | 9216008 U1 | * | 2/1993 | ............ B60P 1/4421 |
| DE | 9408263 U1 | * | 9/1994 | .............. B60P 1/025 |
| DE | 4442939 A1 | | 6/1995 | |
| DE | 19542816 A1 | * | 5/1997 | ................ B60P 1/02 |
| DE | 19542816 A1 | | 5/1997 | |
| DE | 20220225 U1 | | 3/2003 | |
| DE | 202010001181 U1 | * | 5/2010 | ............ B60P 7/0807 |
| JP | 58180328 A | * | 10/1983 | ............. B62D 33/02 |

OTHER PUBLICATIONS

International Search Report and Written Opinion for International application No. PCT/EP2018/054240, dated Oct. 25, 2018, 8 pages.
Examination Report for European Patent Application No. 18708356.3, dated Aug. 6, 2021, 5 pages.
First Office Action for Chinese Patent Application No. 201880089599.7, dated May 5, 2022, 9 pages.

* cited by examiner

CHASSIS ASSEMBLY FOR A DELIVERY VEHICLE

This application is a 35 USC 371 national phase filing of International Application No. PCT/EP2018/054240, filed Feb. 21, 2018, the disclosure of which is incorporated herein by reference in its entirety.

TECHNICAL FIELD

The invention relates to a chassis assembly for a delivery vehicle, and to a delivery vehicle including said chassis assembly.

BACKGROUND

Loading and unloading goods in a delivery vehicle, such as a delivery truck, is often time consuming and decreases the overall efficiency of a global transport activity. The situation is even worse in specific cases, such as city distribution, where lack of space is an added drawback.

To compensate such drawbacks, some logistics activities have integrated "removable bodies" to their delivery vehicles, such swap bodies, but their usage is still limited and still space consuming.

U.S. Pat. No. 3,724,697 particularly discloses a loading truck including a truck chassis, a support frame which is vertically movable relatively the truck chassis, and a detachable loading platform adapted to be supported by said support frame.

SUMMARY

An object of the invention is to provide an improved chassis assembly for a delivery vehicle which can overcome the drawbacks encountered in conventional chassis assembly.

Another object of the present invention is to provide a chassis assembly for a delivery vehicle which decreases the loading and unloading time for loading and unloading goods in and from a delivery vehicle, while decreasing space consumption for loading/unloading activities According to a first aspect, the invention provides chassis assembly for a delivery vehicle, the chassis assembly including at least:
- a vehicle chassis extending along a longitudinal direction,
- a first supporting part configured to support a first load unit on a first longitudinal side of the vehicle chassis,
- a second supporting part configured to support a second load unit on a second longitudinal side of the vehicle chassis opposite to the first longitudinal side, and
- a lifting device secured to the vehicle chassis and configured to lift up and down the first and second supporting parts with respect to the vehicle chassis so as to vertically displace each of first and second load units supported by the first and second supporting parts between a loading/unloading position and a driving position.

Such a configuration of the chassis assembly according to the present invention allows to carry load units (such as containers) on both sides of the vehicle chassis without any supporting structure below the load units and to load/unload said load units easily and quickly without the need of an external heavy and dangerous tool (such as a forklift, a pallet truck, a liftgate etc). Indeed, by controlling the lifting device, it is possible to lower the first and second supporting part in order to directly load/unload load units on and from the vehicle chassis, and to raise the first and second supporting part in order to keep ground clearance below the load units and to allow a transport of said load units on roads and streets (going through speed bumps and other road obstacles).

The chassis assembly may also include one or more of the following features, taken alone or in combination.

According to an embodiment of the invention, the second load unit is distinct and independent from the first load unit.

According to an embodiment of the invention, the lifting device is configured to simultaneously or independently lift up and down the first and second supporting parts.

According to an embodiment of the invention, the lifting device is secured to an upper surface of the vehicle chassis.

According to an embodiment of the invention, the first supporting part includes at least one first attachment member configured to cooperate with at least one attachment element provided on the first load unit, and the second supporting part includes at least one second attachment member configured to cooperate with at least one attachment element provided on the second load unit.

According to an embodiment of the invention, the lifting device includes a fixed lower part secured to the vehicle chassis and a movable upper part vertically movable relative to the fixed lower part.

According to an embodiment of the invention, the movable upper part is vertically movable between an extended position and a retracted position.

According to an embodiment of the invention, the fixed lower part of the lifting device is formed by a fixed lower frame.

According to an embodiment of the invention, the movable upper part of the lifting device is formed by a horizontal upper platform or deck.

According to an embodiment of the invention, the lifting device further includes at least one pair of crossed legs supporting the movable upper part on the fixed lower part. Advantageously, the at least one pair of crossed legs includes:
- a first leg having a first end pivotally attached to the fixed lower part, a second end slidably and pivotally attached to the movable upper part, and an intermediate portion therebetween; and
- a second leg having a first end slidably and pivotally attached to the fixed lower part, a second end pivotally attached to the movable upper part, and an intermediate portion therebetween, the second leg being transverse to the first leg and the intermediate portions of the first and second legs being pivotally connected about a hinge pin.

According to an embodiment of the invention, the lifting device includes a pair of crossed legs on either side of the lifting device.

According to an embodiment of the invention, the lifting device further includes an actuator configured to vertically move the movable upper part relative to the fixed lower part.

According to an embodiment of the invention, the actuator is a cylinder and for example a hydraulic or pneumatic cylinder.

According to an embodiment of the invention, the first supporting part includes a first supporting frame secured to the lifting device and located on the first longitudinal side of the vehicle chassis, and the second supporting part includes a second supporting frame secured to the lifting device and located on the second longitudinal side of the vehicle chassis.

According to an embodiment of the invention, the first supporting frame and the second supporting frame extend substantially vertically.

According to an embodiment of the invention, the first supporting frame and the second supporting frame are secured to the movable upper part of the lifting device.

According to an embodiment of the invention, the first supporting frame and the second supporting frame are hanging from the movable upper part of the lifting device.

According to an embodiment of the invention, the first supporting frame includes a horizontal upper member secured to the movable upper part of the lifting device, and for example to a first longitudinal edge of the movable upper part, and the second supporting frame includes a horizontal upper member secured to the movable upper part of the lifting device, and for example to a second longitudinal edge of the movable upper part which is opposite to the first longitudinal edge.

According to an embodiment of the invention, the chassis assembly further includes a first guiding part configured to slidably guide the first supporting frame during vertical movements of the first supporting frame with respect to the vehicle chassis and to prevent rotation of the first supporting frame with respect to the vehicle chassis, and a second guiding part configured to slidably guide the second supporting frame during vertical displacements of the second supporting frame with respect to the vehicle chassis and to prevent rotation of the second supporting frame with respect to the vehicle chassis. Such a configuration of the chassis assembly prevents roll movements of the first and second supporting frames and thus of the first and second load units supported by the first and second supporting frames, and therefore increases the safety of the goods transport with the present chassis assembly.

According to an embodiment of the invention, the first guiding part and the second guiding part are provided on the lifting device, and for example on the fixed lower part of the lifting device. Each of the first guiding part and the second guiding part may for example be tubular.

According to an embodiment of the invention, the at least one first attachment member is secured to the first supporting frame, and the at least one second attachment member is secured to the second supporting frame.

According to an embodiment of the invention, the first supporting part further includes a pair of first attachment members secured to the first supporting frame and configured to cooperate with respective attachment elements provided on both lateral sides of a first load unit intended to be supported by the first supporting part, and the second supporting part further includes a pair of second attachment members secured to the second supporting frame and configured to cooperate with respective attachment elements provided on both lateral sides of a second load unit intended to be supported by the second supporting part.

According to an embodiment of the invention, the first attachment members are configured to support the first load unit intended to be supported by the first supporting part, and the second attachment members are configured to support the second load unit intended to be supported by the second supporting part.

According to an embodiment of the invention, the first attachment members are configured to cooperate with respective attachment passages, such as attachment ears or attachment notches, provided on both lateral sides of a first load unit intended to be supported by the first supporting part, and the second attachment members are configured to cooperate with respective attachment passages, such as attachment ears or attachment notches, provided on both lateral sides of a second load unit intended to be supported by the second supporting part.

According to an embodiment of the invention, each of the first and second attachment members is elongated and extends substantially horizontally.

According to an embodiment of the invention, each of the first and second attachment members extends substantially perpendicularly to the longitudinal direction of the vehicle chassis.

According to an embodiment of the invention, each of the first attachment members is removably secured to the first supporting frame, and each of the second attachment members is removably secured to the second supporting frame.

According to an embodiment of the invention, each of the first and second attachment members is foldable between an attachment position in which it extends substantially horizontally and a folded position.

According to an embodiment of the invention, the first supporting part includes several, and for example two, pairs of first attachment members, the pairs of first attachment members being vertically offset from one another, and the second supporting part includes several, and for example two, pairs of second attachment members, the pairs of second attachment members being vertically offset from one another.

According to an embodiment of the invention, the first supporting part further includes a first protection member forming a first side under-run protection, and the second supporting part further includes a second protection member forming a second side under-run protection. Such a configuration of the first and second supporting parts guarantees the respect of the regulations for delivery vehicle, as they allow the delivery vehicle to be driven even without load units supported by the first and second supporting parts.

According to an embodiment of the invention, the first protection member is secured to the first attachment members (for example to free ends of the first attachment members) away from the first supporting frame, and the second protection member is secured to the second attachment members (for example to free ends of the second attachment members) away from the second supporting frame.

According to an embodiment of the invention, the first protection member is configured to cooperate with a first load unit supported by the first supporting part so as to prevent translation of said first load unit with respect to the first supporting frame, and particularly along a transversal direction substantially horizontal and transversal to the longitudinal direction of the vehicle chassis, and the second protection member is configured to cooperate with a second load unit supported by the second supporting part so as to prevent translation of said second load unit with respect to the second supporting frame, and particularly along the transversal direction.

According to an embodiment of the invention, each of the first and second protection members extends substantially horizontally. Advantageously, the first and second protection members extend substantially parallelly to the longitudinal direction of the vehicle chassis.

According to an embodiment of the invention, the first supporting frame, the first protection member and the first attachment members define a first receiving area for receiving a first load unit, and the second supporting frame, the second protection member and the second attachment members define a second receiving area for receiving a second load unit.

According to an embodiment of the invention, the first supporting part includes several first protection members each secured to two first attachment members belonging to a same pair of first attachment members, and the second supporting part includes several second protection members each secured to two second attachment members belonging to a same pair of second attachment members.

According to an embodiment of the invention, the vehicle chassis has a chassis width between 600 and 800 mm.

According to an embodiment of the invention, the upper surface of the vehicle chassis may be used to carry equipments usually fitted on both sides of the vehicle chassis (such as tanks, batteries, exhaust system . . . ). Further the volume located above the rear wheels of the chassis assembly may be used for this purpose too.

According to an embodiment of the invention, the at least one first attachment member includes a first hooking member provided on the lifting device and configured to cooperate with a hooking element provided on a first load unit intended to be supported by the first supporting part, and the at least one second attachment member includes a second hooking member provided on the lifting device and configured to cooperate with a hooking element provided on a second load unit intended to be supported by the second supporting part.

According to an embodiment of the invention, the first and second hooking members are provided on the movable upper part of the lifting device.

According to an embodiment of the invention, the first hooking member extends along a first longitudinal edge of the movable upper part of the lifting device, and the second hooking member extends along a second longitudinal edge of the movable upper part which is opposite to the first longitudinal edge of the movable upper part.

According to an embodiment of the invention, the first and second supporting parts are configured such that the first and second load units are hanging from the lifting device.

According to an embodiment of the invention, the chassis assembly includes:
  several first supporting parts longitudinally offset from each other and each configured to support a respective first load unit on the first longitudinal side of the vehicle chassis,
  several second supporting parts longitudinally offset from each other and each configured to support a respective second load unit on the second longitudinal side of the vehicle chassis, and
  several lifting devices longitudinally offset from each other and each configured to lift up and down a respective first supporting part and a respective second supporting part.

According to an embodiment of the invention, each of the first and second load unit may be for example a container or a box.

According to an embodiment of the invention, the chassis assembly includes at least one first load unit and at least one second load unit.

According to an embodiment of the invention, the chassis assembly further includes a third supporting part configured to support a third load unit on a rear side of the vehicle chassis, the lifting device being configured to lift up and down the third supporting part with respect to the vehicle chassis so as to vertically displace each of first, second and third load units supported by the first, second and third supporting parts between a loading/unloading position and a driving position.

According to an embodiment of the invention, the third supporting part includes a third supporting frame secured to the lifting device and located on the rear side of the vehicle chassis. Advantageously, the third supporting frame extends substantially vertically.

According to an embodiment of the invention, the third supporting frame is secured to the movable upper part of the lifting device. Advantageously, the third supporting frame is hanging from the movable upper part of the lifting device, and for example from a rear side of the movable upper part of the lifting device.

The present invention also relates to a delivery vehicle including a chassis assembly according to the present invention.

According to an embodiment of the invention, the ratio between a chassis width and a vehicle overall width is between 0.2 and 0.5.

Advantageously, the vehicle chassis is compatible with the installation on the delivery vehicle of a traditional powertrain, i.e. a powertrain including an engine located under the vehicle cab and a transmission connected to the rear wheels of the delivery vehicle, as well as with the installation of innovative powertrains.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
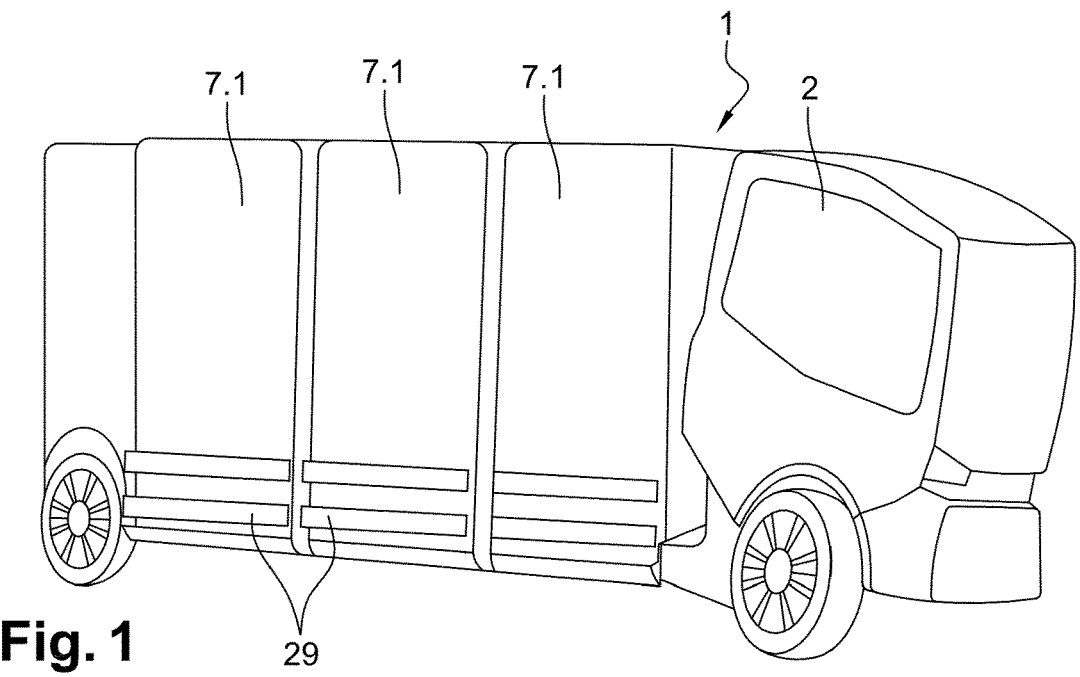
FIG. 1 is a perspective view of a delivery vehicle including a chassis assembly according to a first embodiment of the present invention.
Figure 2:
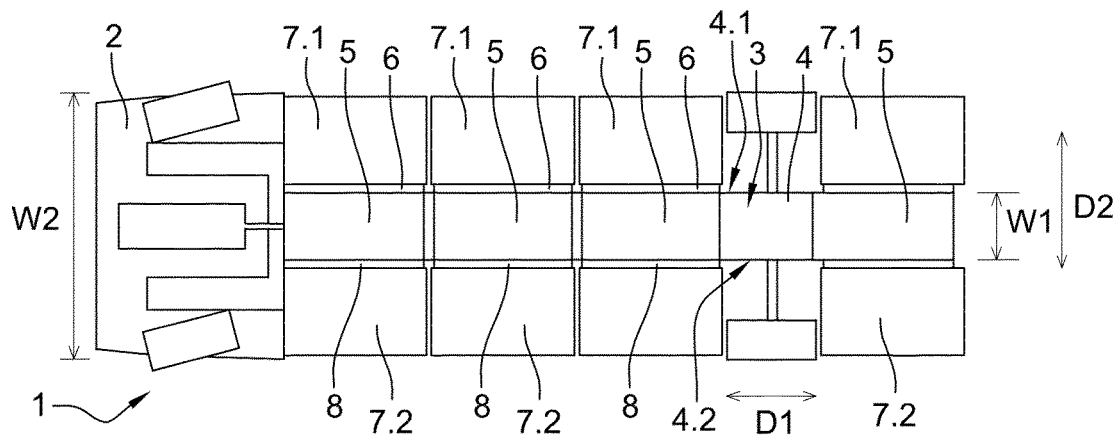
FIGS. 2 and 3 are top and side schematic views of another delivery vehicle including the chassis assembly according to the first embodiment of the present invention.
Figure 3:
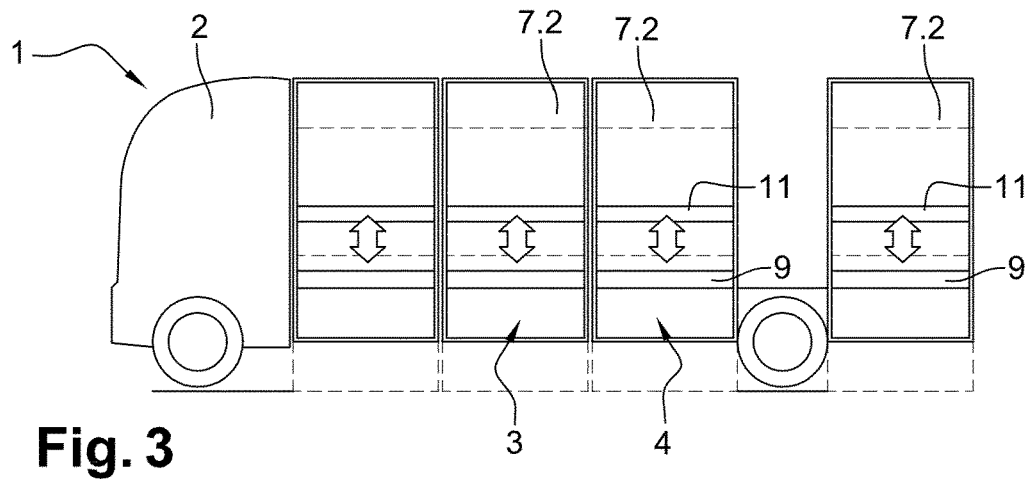

FIG. 1 illustrates schematically a delivery vehicle 1, such as a delivery truck, including a passenger cab 2 and chassis assembly 3.

The chassis assembly 3 includes notably a central vehicle chassis 4 extending along a longitudinal direction D1. Advantageously, the ratio between a chassis width W1 and a vehicle overall width W2 is between 0.2 and 0.5. The vehicle chassis 4 may have a chassis width W1 between 600 and 800 mm, and for example of about 700 mm.

The chassis assembly 3 further includes several lifting devices 5 longitudinally offset from each other along the longitudinal direction D1 and each secured to an upper surface of the vehicle chassis 4.

The chassis assembly 3 also includes several, and for example two, three or four, first supporting parts 6 each configured to support a respective first load unit 7.1 on a first longitudinal side 4.1 of the vehicle chassis 4, and several, and for example two, three or four, second supporting parts 8 each configured to support a respective second load unit 7.2 on a second longitudinal side 4.2 of the vehicle chassis 4 opposite to the first longitudinal side 4.1. Each of the first and second load units 7.1, 7.2 may be for example a container or a box. However, each of the first and second load units 7.1, 7.2 is preferably a container. Advantageously, each of the first and second load units 7.1, 7.2 may include casters configured to roll on the floor in order to allow an easy displacement of the load unit once dropped off on the floor. Advantageously, each of the first and second load units 7.1, 7.2 may be configured to receive one Euro pallet, i.e. one pallet according to the European standard, or several Euro pallets arranged side by side.

Advantageously, each lifting device 5 is configured to lift up and down a respective first supporting part 6 and a respective second supporting part 8 with respect to the vehicle chassis 4 so as to vertically displace each of the first and second load units 7.1, 7.2 supported by the respective first and second supporting parts 6, 8 between a loading/unloading position in which the respective load unit is near the floor and a driving position in which the respective load unit is raised and distant from the floor. Each lifting device 5 may be configured to simultaneously or independently lift up and down the respective first and second supporting parts 6, 8.

Figure 4:
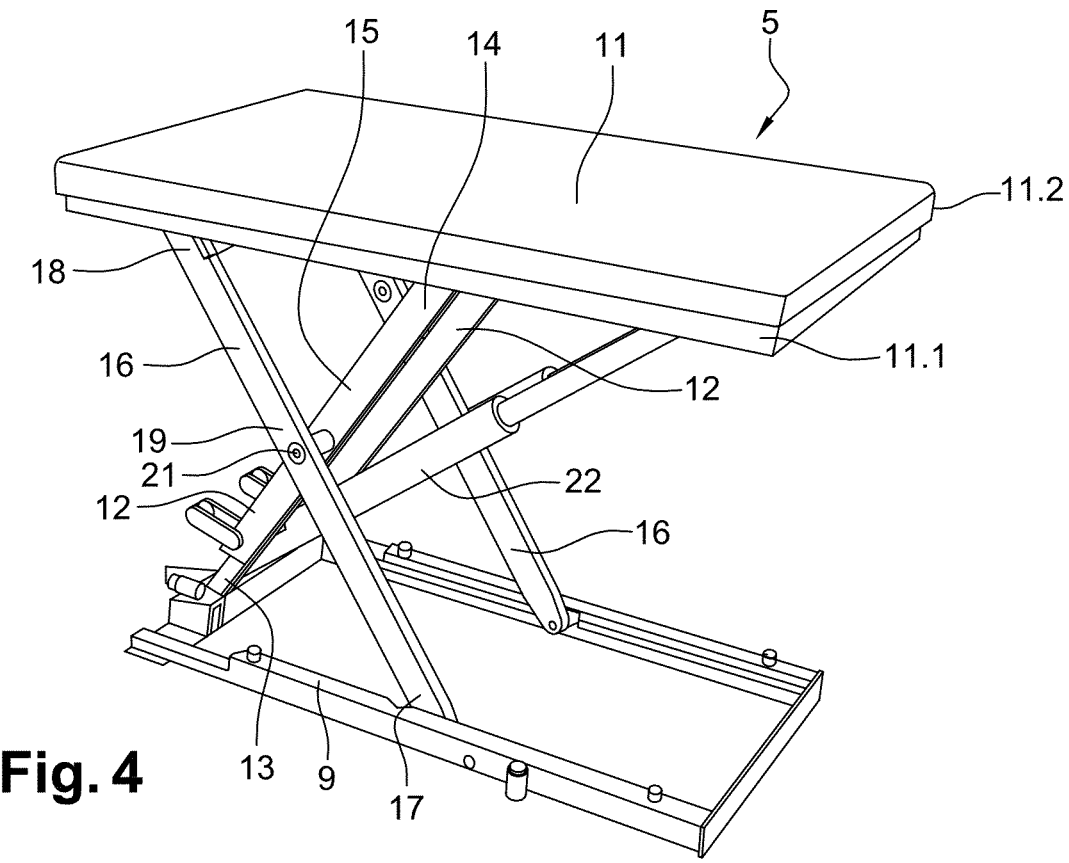
FIG. 4 is a perspective view of a lifting device of the chassis assembly according to the first embodiment of the present invention.

According to the embodiment shown on the figures, each lifting device 5 includes (see FIG. 4) a fixed lower part 9, for example formed by fixed lower frame, secured to the vehicle chassis 4, and a movable upper part 11, for example formed by a horizontal upper platform, vertically movable relative to the respective fixed lower part 9 between an extended position and a retracted position.

Each lifting device 5 further includes two pairs of crossed legs supporting the respective movable upper part 8 on the respective fixed lower part 6. The two pairs of crossed legs of each lifting device 5 are advantageously arranged on either side of respective the lifting device 5.

Each pair of crossed legs of each lifting device 5 particularly includes:
- a first leg 12 having a first end 13 pivotally attached to the fixed lower part 9, a second end 14 slidably and pivotally attached to the movable upper part 11, and an intermediate portion 15 located between the first and second ends 13, 14 of the first leg 12; and
- a second leg 16 having a first end 17 slidably and pivotally attached to the fixed lower part 9, a second end 18 pivotally attached to the movable upper part 11, and an intermediate portion 19 located between the first and second ends 17, 18 of the second leg 16, the second leg 16 being transverse to the respective first leg 12 and the intermediate portions 15, 19 of the first and second legs 12, 16 being pivotally connected about a hinge pin 21.

Each lifting device 5 also includes an actuator 22 configured to vertically move the respective movable upper part 11 relative to the respective fixed lower part 9. The actuator 22 of each lifting device 5 may be a cylinder and for example a hydraulic or pneumatic cylinder.

According to the first embodiment of the invention, each first supporting part 6 includes a first supporting frame 23 secured to the movable upper part 11 of the respective lifting device 5 and located on the first longitudinal side 4.1 of the vehicle chassis 4, and the second supporting part 8 includes a second supporting frame 24 secured to the movable upper part 11 of the respective lifting device 5 and located on the second longitudinal side 4.2 of the vehicle chassis 4. Advantageously, each of the first and second supporting frames 23, 24 is rectangular and extends vertically. Particularly, each of the first and second supporting frames 23, 24 includes a horizontal upper member, a horizontal lower member and two opposite vertical members.

Figure 5:
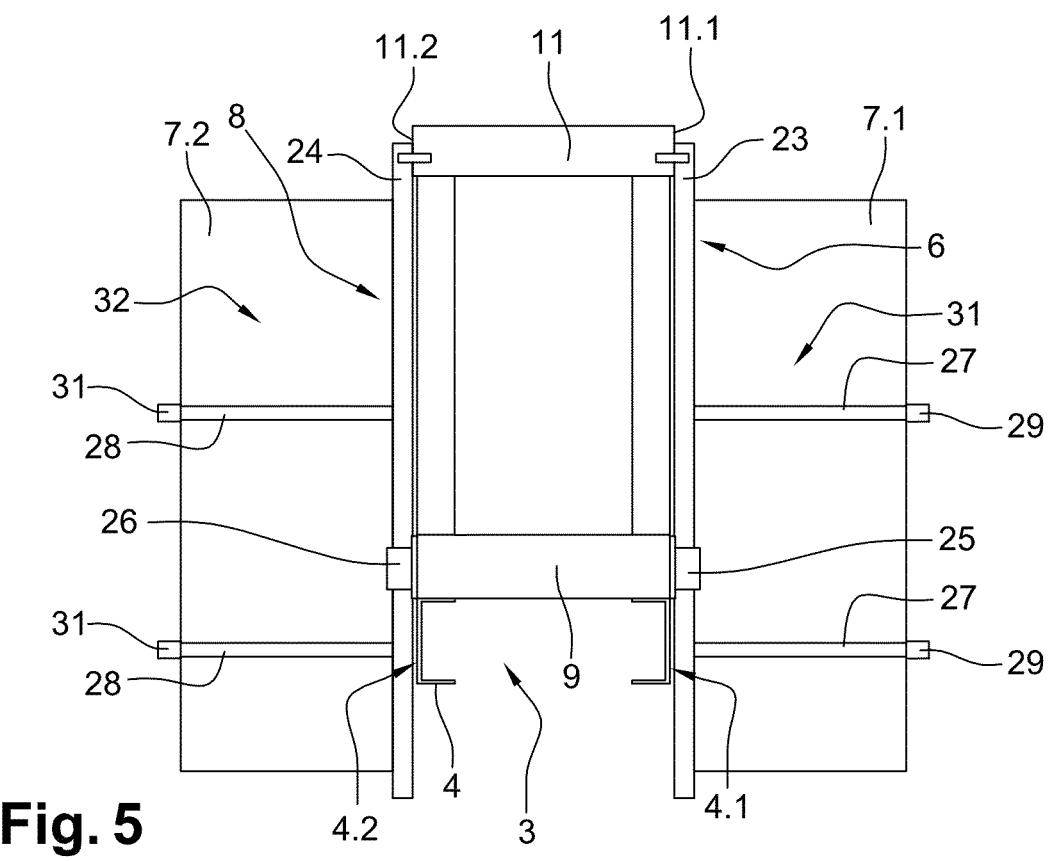
FIG. 5 is a cross section view of the chassis assembly according to the first embodiment of the present invention.
Figure 6:
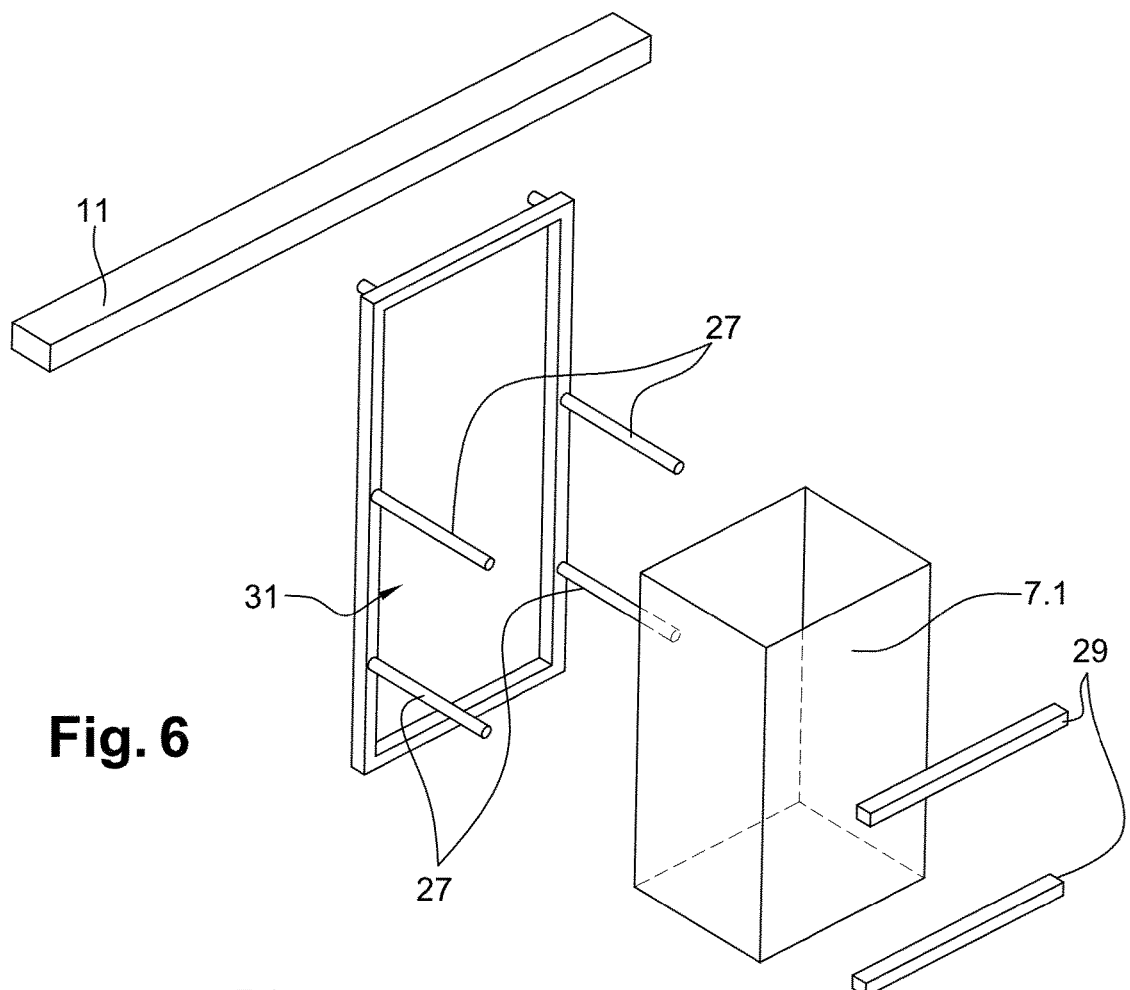
FIG. 6 is an exploded perspective view of supporting frame of the chassis assembly of FIG. 5.

As better shown on FIGS. 5 and 6, each of the first and second supporting frames 23, 24 is hanging from the movable upper part 11 of the respective lifting device 5. Advantageously, the horizontal upper member of each first supporting frame 23 is secured to a first longitudinal edge 11.1 of the movable upper part 11 of the respective lifting device 5, and the horizontal upper member of each second supporting frame 24 is secured to a second longitudinal edge 11.2 of the movable upper part 11 of the respective lifting device 5, which is opposite to the respective first longitudinal edge 11.1.

Advantageously, each lifting device 5 further includes a first guiding part 25 configured to slidably guide the respective first supporting frame 23 during vertical movements of the latter with respect to the vehicle chassis 4 and to prevent rotation of the respective first supporting frame 23 with respect to the vehicle chassis 4, and a second guiding part 26 configured to slidably guide the respective second supporting frame 24 during vertical displacements of the latter with respect to the vehicle chassis 4 and to prevent rotation of the respective second supporting frame 24 with respect to the vehicle chassis 4. According to the first embodiment of the invention, each first guiding part 25 includes a pair of first guiding members each secured to the respective fixed lower part 9 and each configured to slidably guide a respective vertical member of the respective first supporting frame 23 during vertical movements of the latter, and each second guiding part 26 includes a pair of second guiding members each secured to the respective fixed lower part 9 and each configured to slidably guide a respective vertical member of the respective second supporting frame 24 during vertical movements of the latter. Each of the first and second guiding members may for example be tubular.

As shown on FIGS. 5 and 6, each first supporting part 6 further includes several, and for example two, pairs of first attachment members 27 secured to the respective first supporting frame 23 and configured to cooperate with respective attachment elements provided on the respective first load unit 7.1. Advantageously, the pairs of first attachment members 27 are vertically offset from one another, and each pair of first attachment members 27 includes two first attachment members 27 respectively secured to the two vertical members of the respective first supporting frame 23 and configured to cooperate with respective attachment passages, such as attachment ears or attachment notches, provided on both lateral sides of the respective first load unit 7.1.

Each second supporting part 8 further includes several, and for example two, pairs of second attachment members 28 secured to the respective second supporting frame 24 and configured to cooperate with respective attachment elements provided on the respective second load unit 7.2. Advantageously, the pairs of second attachment members 28 are vertically offset from one another, and each pair of second attachment members 28 includes two first attachment members 28 respectively secured to the two vertical members of the respective second supporting frame 24 and configured to cooperate with respective attachment passages, such as attachment ears or attachment notches, provided on both lateral sides of the respective second load unit 7.2.

Advantageously, each of the first and second attachment members 27, 28 is elongated and extends horizontally and perpendicularly to the longitudinal direction D1 of the vehicle chassis 4. Further each first attachment member 27 is configured to support the respective first load unit 7.1, and each second attachment member is configured to support the respective second load unit 7.2.

According to an embodiment of the invention, each of the first attachment members 27 may be removably secured to the respective first supporting frame 23, and each of the second attachment members 28 may be removably secured to the respective second supporting frame 24. Alternatively, each of the first and second attachment members 27, 28 may be foldable between an attachment position in which it extends horizontally and a folded position.

Furthermore each first supporting part 6 includes several, and for example two, first protection members 29 respectively secured to two respective first attachment members 27 belonging to a same pair of first attachment members. Each first protection members 29 is located away from the respective first supporting frame 23, and extends horizontally and parallelly to the longitudinal direction D1 of the vehicle chassis 4. Advantageously, each first supporting frame 23 defines, with the respective first protection members 29 and the respective first attachment members 27, a first receiving area 31 configured to receive the respective first load unit 7.1.

Each first protection members 29 is particularly configured to cooperate with the front face of the first load unit 7.1 supported by the respective first supporting part 6 so as to prevent translation of said first load unit 7.1 with respect to the respective first supporting frame 23 along a transversal direction D2 which is horizontal and transversal to the longitudinal direction D1 of the vehicle chassis 4, i.e. along the respective first attachment members 27.

Similarly each second supporting part 8 includes several, and for example two, second protection members 31 respectively secured to two respective second attachment members 28 belonging to a same pair of first attachment members. Each second protection members 31 is located away from the respective second supporting frame 24, and extends horizontally and parallelly to the longitudinal direction D1 of the vehicle chassis 4. Advantageously, each second supporting frame 24 defines, with the respective second protection members 31 and the respective second attachment members 28, a second receiving area 32 configured to receive the respective second load unit 7.2.

Each second protection members 31 is particularly configured to cooperate with the front face of the second load unit 7.2 supported by the respective second supporting part 8 so as to prevent translation of said the second load unit 7.2 with respect to the respective second supporting frame 24 along the transversal direction D2, i.e. along the respective second attachment members 28.

Advantageously, the first protection members 29 of each first supporting part 6 and the second protection members 31 of each second supporting part 8 form side under-run protections.

Figure 7:
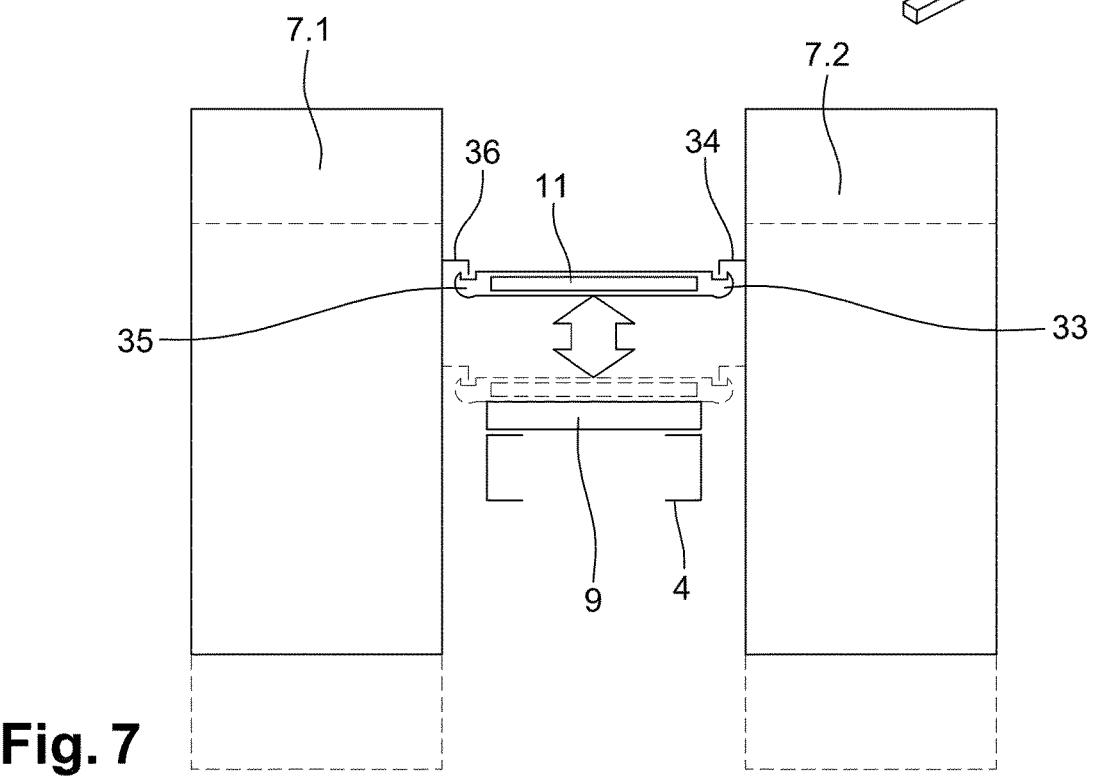
FIG. 7 is a cross section view of the chassis assembly according to a second embodiment of the present invention.

FIG. 7 represents a chassis assembly 3 according to a second embodiment of the invention which differs from the first embodiment disclosed above in that each first supporting part 6 includes, as first attachment member, a first hooking member 33 provided on the movable upper part 11 of the respective lifting device 5 and configured to cooperate with a hooking element 34 provided on the rear face of the first load unit 7.1 intended to be supported by said first supporting part 6, and in that each second supporting part 8 includes, as second attachment member, a second hooking member 35 provided on the movable upper part 11 of the respective lifting device 5 and configured to cooperate with a hooking element 36 provided on the rear face of the second load unit 7.2 intended to be supported by said second supporting part 8. Advantageously the each hooking member extends along the first longitudinal edge 11.1 of the movable upper part 11 of the respective lifting device 5, each the second hooking member extends along the second longitudinal edge 11.2 of the movable upper part 11 of the respective lifting device 5.

Figure 8:
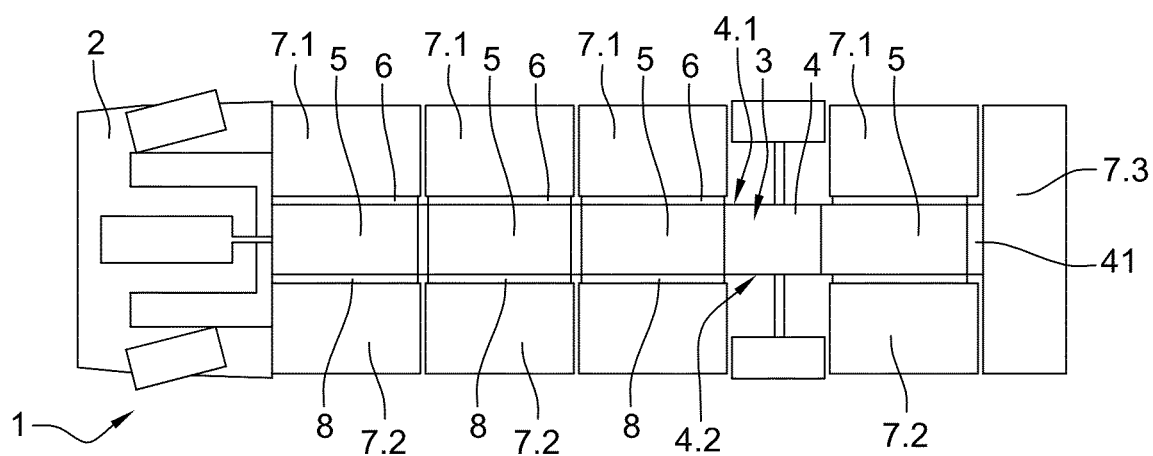
FIG. 8 is a top schematic view of another delivery vehicle including a chassis assembly according to a third embodiment of the present invention.

FIG. 8 represents a delivery vehicle 1 including a chassis assembly 3 according to a third embodiment of the invention which differs from the first embodiment in that the chassis assembly 3 further includes a third supporting part 41 configured to support a third load unit 7.3 on a rear side of the vehicle chassis 4, and in that the lifting device 5, arranged at the rear of the vehicle chassis 4, is further configured to lift up and down the third supporting part 41 with respect to the vehicle chassis 4 so as to vertically displace each of the first, second and third load units 7.1, 7.2, 7.3 supported by the respective first, second and third supporting parts 6, 8, 41 between a loading/unloading position and a driving position.

According to the third embodiment of the invention, the third supporting part 41 may include a third supporting frame secured to a rear side of the movable upper part 11 of the respective lifting device 5 and located on the rear side of the vehicle chassis 4.

Advantageously, the third supporting frame may extend substantially vertically and may hang from the movable upper part 11 of the respective lifting device 5.

It is to be understood that the present invention is not limited to the embodiment described above and illustrated in the drawings; rather, the skilled person will recognize that many changes and modifications may be made within the scope of the appended claims. For example, the chassis assembly 3 may carry more than four load units, and thus may include more than four first supporting parts, more than four second supporting parts, and more than four lifting devices.

The invention claimed is:

1. A chassis assembly for a delivery vehicle, the chassis assembly including at least:
   a vehicle chassis extending along a longitudinal direction,
   a first supporting part configured to support a first load unit on a first longitudinal side of the vehicle chassis,
   a second supporting part configured to support a second load unit on a second longitudinal side of the vehicle chassis opposite to the first longitudinal side,
   a lifting device secured to the vehicle chassis and configured to lift up and down the first and second supporting parts with respect to the vehicle chassis so as to vertically displace each of the first and second load units supported by the first and second supporting parts between a loading/unloading position and a driving position;
   wherein:
   the first supporting part comprises a first supporting frame secured to the lifting device and located on the first longitudinal side of the vehicle chassis;
   the second supporting part comprises a second supporting frame secured to the lifting device and located on the second longitudinal side of the vehicle chassis; and the chassis assembly further comprises:
- a first guiding part configured to slidably guide the first supporting frame during vertical movements of the first supporting frame with respect to the vehicle chassis and to prevent rotation of the first supporting frame with respect to the vehicle chassis; and
- a second guiding part configured to slidably guide the second supporting frame during vertical displacements of the second supporting frame with respect to the vehicle chassis and to prevent rotation of the second supporting frame with respect to the vehicle chassis.

2. The chassis assembly of claim 1, wherein the first supporting part includes at least one first attachment member configured to cooperate with at least one attachment element provided on the first load unit, and the second supporting part includes at least one second attachment member configured to cooperate with at least one attachment element provided on the second load unit.

3. The chassis assembly of claim 1, wherein the lifting device includes a fixed lower part secured to the vehicle chassis and a movable upper part vertically movable relative to the fixed lower part.

4. The chassis assembly of claim 3, wherein the lifting device further includes an actuator configured to vertically move the movable upper part relative to the fixed lower part.

5. The chassis assembly of claim 1, wherein the first supporting frame and the second supporting frame are secured to a movable upper part of the lifting device, and wherein the lifting device includes a fixed lower part secured to the vehicle chassis and the movable upper part is vertically movable relative to the fixed lower part.

6. The chassis assembly of claim 5, wherein the first supporting frame and the second supporting frame are hanging from the movable upper part of the lifting device.

7. The chassis assembly of claim 1, wherein the first supporting part further includes a pair of first attachment members secured to the first supporting frame and configured to cooperate with respective attachment elements provided on both lateral sides of a first load unit intended to be supported by the first supporting part, and the second supporting part further includes a pair of second attachment members secured to the second supporting frame and configured to cooperate with respective attachment elements provided on both lateral sides of a second load unit intended to be supported by the second supporting part.

8. The chassis assembly of claim 7, wherein each of the pairs of the first and second attachment members is elongated and extends substantially horizontally.

9. The chassis assembly of claim 8, wherein each of the pairs of the first and second attachment members extends substantially perpendicularly to the longitudinal direction of the vehicle chassis.

10. The chassis assembly of claim 7, wherein each of the first attachment members is removably secured to the first supporting frame, and each of the second attachment members is removably secured to the second supporting frame.

11. The chassis assembly of claim 7, wherein each of the pairs of the first and second attachment members is foldable between an attachment position in which it extends substantially horizontally and a folded position.

12. The chassis assembly of claim 7, wherein the first supporting part further includes a first protection member forming a first side under-run protection, and the second supporting part further includes a second protection member forming a second side under-run protection.

13. The chassis assembly of claim 12, wherein the first protection member is configured to cooperate with a first load unit supported by the first supporting part so as to prevent translation of said first load unit with respect to the first supporting frame, and the second protection member is configured to cooperate with a second load unit supported by the second supporting part so as to prevent translation of said second load unit with respect to the second supporting frame.

14. The chassis assembly of claim 1, wherein the chassis assembly includes:
- several first supporting parts longitudinally offset from each other and each configured to support a respective first load unit on the first longitudinal side of the vehicle chassis,
- several second supporting parts longitudinally offset from each other and each configured to support a respective second load unit on the second longitudinal side of the vehicle chassis, and
- several lifting devices longitudinally offset from each other and each configured to lift up and down a respective first supporting part and a respective second supporting part.

* * * * *